United States Patent
Shao et al.

(10) Patent No.: US 9,859,950 B2
(45) Date of Patent: Jan. 2, 2018

(54) WIRELESS POWER RECEIVER WITH MAGNETIC DATA TRANSACTION CAPABILITY

(71) Applicant: INTEGRATED DEVICE TECHNOLOGY, INC.

(72) Inventors: Zhuyan Shao, San Jose, CA (US); Lijie Zhao, San Jose, CA (US); Yue Wang, Santa Clara, CA (US); Jianbin Hao, San Jose, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 0 days.

(21) Appl. No.: 14/975,530

(22) Filed: Dec. 18, 2015

(65) Prior Publication Data

US 2017/0126278 A1 May 4, 2017

Related U.S. Application Data

(60) Provisional application No. 62/247,851, filed on Oct. 29, 2015.

(51) Int. Cl.
*H04B 3/54* (2006.01)
*H04B 5/00* (2006.01)

(52) U.S. Cl.
CPC .......... *H04B 3/542* (2013.01); *H04B 5/0037* (2013.01)

(58) Field of Classification Search
CPC ..... H04B 3/542; H04B 5/0031; H04B 5/0037
See application file for complete search history.

(56) References Cited

U.S. PATENT DOCUMENTS

| | | | | |
|---|---|---|---|---|
| 2011/0217927 A1* | 9/2011 | Ben-Shalom | ........... | H02J 7/025 455/41.1 |
| 2011/0264945 A1* | 10/2011 | Tsai | ........................ | G06F 1/266 713/340 |
| 2012/0235508 A1* | 9/2012 | Ichikawa | ................ | H02J 5/005 307/104 |
| 2013/0147279 A1* | 6/2013 | Muratov | ................. | H02J 5/005 307/104 |
| 2014/0179223 A1* | 6/2014 | Sessink | .............. | G07C 9/00309 455/41.1 |
| 2015/0349849 A1* | 12/2015 | Joehren | ................. | H04W 4/008 455/41.1 |

* cited by examiner

*Primary Examiner* — David B. Lugo

(74) *Attorney, Agent, or Firm* — Haynes and Boone, LLP

(57) ABSTRACT

A transmitter/receiver that includes a wireless power receiving mode and a data transmission mode. In the wireless power receiving mode, the transmitter/receiver receives wireless power through and coil and provides power to a load. In data transmission mode, the transmitter/receives drives the coil according to data to transmit data.

18 Claims, 7 Drawing Sheets

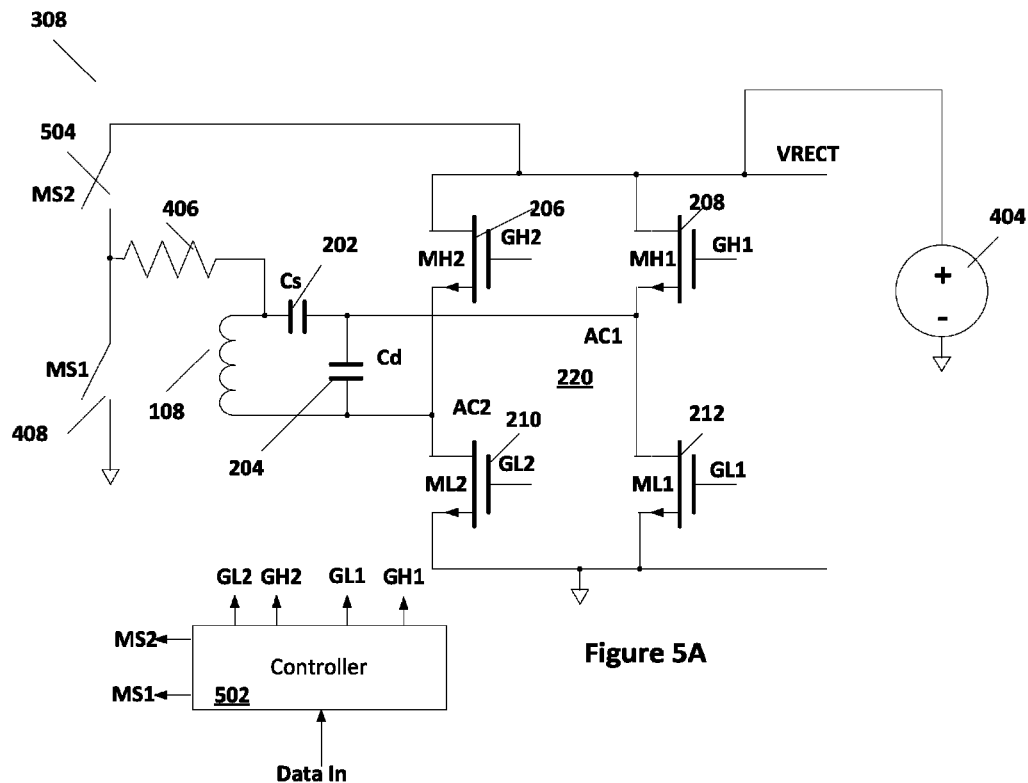
Figure 5A
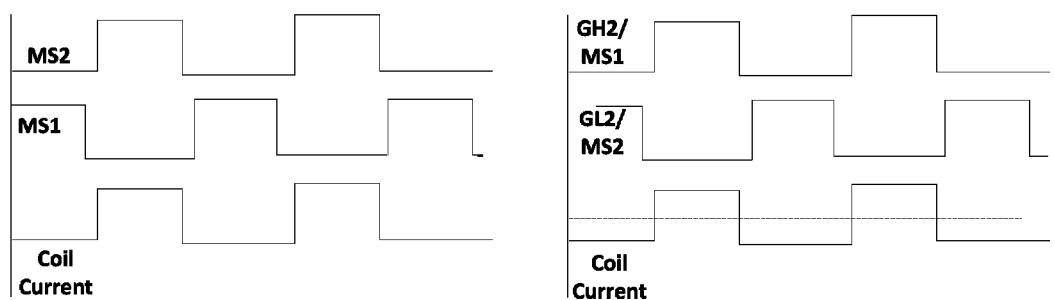
Figure 5B
Figure 5C

WIRELESS POWER RECEIVER WITH MAGNETIC DATA TRANSACTION CAPABILITY

RELATED APPLICATIONS

This disclosure claims priority to U.S. Provisional Patent Application 62/247,851 by Lijie Zhao, Yue Wang, Zhuyan Shao, and Jianbin Hao, entitled "A Circuit for Wireless Transfer of Data and Power," filed on Oct. 29, 2015, which is herein incorporated by reference in its entirety.

TECHNICAL FIELD

Embodiments of the present invention are related to wireless power receivers and, specifically, to wireless power receivers capable of magnetic transfer of transaction data as well as receipt of wireless power.

DISCUSSION OF RELATED ART

Mobile devices, for example smart phones and tablets, are expected to provide expanded capability. In particular, such devices are increasingly being utilized in the market place for providing transaction data. In particular, mobile devices are being used to provide payment information at point-of-sale (POS) locations in place of credit cards or other devices. As such, the mobile device is often tasked with transferring data magnetically to a vender's POS device. Transfer of data magnetically from a mobile device requires the use of driving circuitry and a magnetic coil built into the device.

Mobile devices are further being equipped with wireless power receivers. Such wireless power receivers also require a magnetic coil and circuitry designed to receive the transmitted power. Currently, these two functions are separated, requiring that mobile devices include separate coils and control circuitry for wireless power transfer and data transactions.

Therefore, there is a need to develop better wireless charging technologies and data transfer technologies.

SUMMARY

In accordance with aspects of the presents a dual purpose receiver/transmitter. In some embodiments, the receiver/transmitter includes a coil; a rectifier circuit configured to receive wireless power coupled to the coil; a data transmission circuit configured to transmit data coupled to the coil; and a controller coupled to the rectifier circuit and the data transmission circuit, the controller configured to provide control signals to the rectifier circuit to receive wireless power in a wireless power receive mode and configured to provide control signals to the data transmission circuit to provide current to the coil according to data in a data transmission mode.

In some embodiments, a method includes receiving wireless power through a coil while in a wireless power transmission mode; and transmitting data magnetically through the coil while in a data transmission mode.

These and other embodiments are further discussed below with respect to the following figures.

BRIEF DESCRIPTION OF THE DRAWINGS

FIGS. 5A, 5B, and 5C illustrate another receiver according to some embodiments of the present invention.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description and the accompanying drawings that illustrate inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Figure 1:
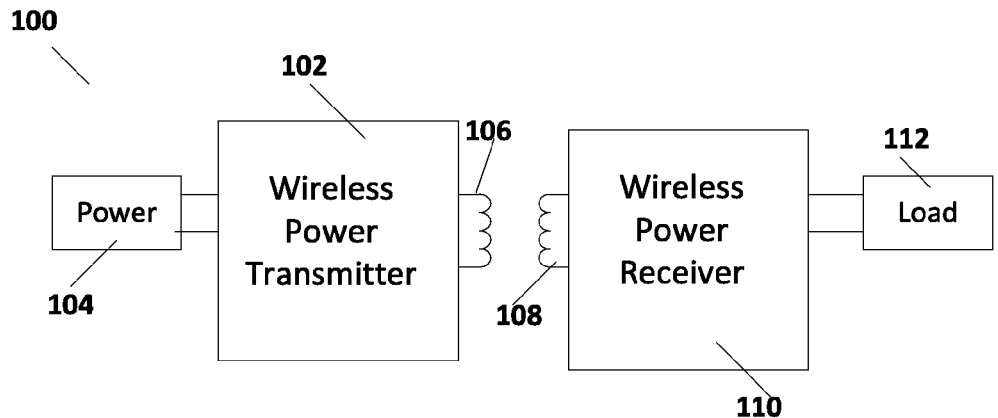
FIG. 1 illustrates a wireless power transmission system.

FIG. 1 illustrates a system 100 for wireless transfer of power. As illustrated in FIG. 1, a wireless power transmitter 102 drives a coil 106 to produce a magnetic field. A power supply 104 provides power to wireless power transmitter 102. Power supply 104 can be, for example, a battery based supply or may be powered by alternating current for example 120V at 60 Hz. Wireless power transmitter 102 drives coil 106 at, typically, a range of frequencies, typically according to one of the wireless power standards.

There are multiple standards for wireless transmission of power, including the Alliance for Wireless Power (A4WP) standard and the Wireless Power Consortium standard, the Qi Standard. Under the A4WP standard, for example, up to 50 watts of power can be inductively transmitted to multiple charging devices in the vicinity of coil 106 at a power transmission frequency of around 6.78 MHz. Under the Wireless Power Consortium, the Qi specification, a resonant inductive coupling system is utilized to charge a single device at the resonance frequency of the device. In the Qi standard, coils 108 is placed in close proximity with coil 106 while in the A4WP standard, coil 108 is placed near coil 106 along with other coils that belong to other charging devices. FIG. 1 depicts a generalized wireless power system 100 that operates under any of these standards.

As is further illustrated in FIG. 1, the magnetic field produced by coil 106 induces a current in coil 108, which results in power being received in a receiver 110. Receiver 110 the receives the power from coil 108 and provides power to a load 112, which may be a battery charger and/or other components of a mobile device. Receiver 110 typically includes rectification to convert the received AC power to DC power for load 112.

Figure 2:
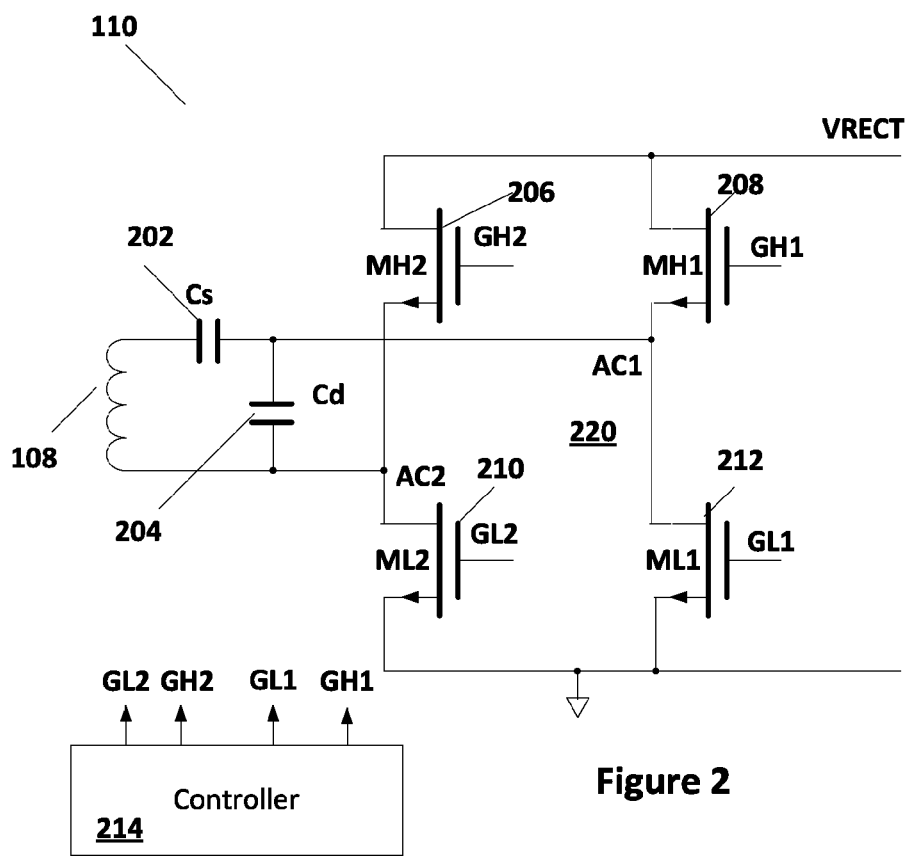
FIG. 2 illustrates a receiver of a wireless power transmission system that can be used in the transmission system illustrated in FIG. 1.

FIG. 2 illustrates an example of receiver 110 illustrated in FIG. 1. As shown in FIG. 2, coil 108 is coupled through capacitor 202 and capacitor 204 to a full-bridge rectifier circuit 220 formed by metal oxide semiconductor field effect transistors (MOSFETs) 206, 208, 210 and 212. AC power, illustrated as AC1 and AC2, received by coil 108 is rectified in rectifier 220 to generate rectified voltage VRECT. The gates of transistors 206, 208, 210 and 212, labeled GH2, GH1, GL2, and GL1, respectively, are driven by a controller 214. Controller 214 can drive the gates of transistors 206, 208, 210, and 212 to optimize the receipt of power at coil 108 and the delivery of rectified power to load 112. In some embodiments, the output from rectifier 220, the voltage labeled VRECT in FIG. 2, may be further filtered and processed prior to assertion across load 112. VRECT can be placed on a power line while transistors 210 and 212 coupled to a ground line. One skilled in the art will recognize that, although a full-bridge rectifier 220 is illustrated in FIG. 2, other embodiments may include a half-bridge rectifier. Further, various filtering and boost circuits may also be used in providing DC voltage VRECT to a load 112.

Some embodiments of the present invention are illustrated using the components of receiver 110. One skilled in the art will recognize how other receivers can be modified to provide further embodiments of the invention.

In general, receivers according to embodiments of the present invention utilize a single coil 108 while operating in either a wireless power transmission mode or a magnetic signaling transmission (MST) mode, which can be used for transmission of transaction data. During the wireless power transmission mode, coil 108 receives power that is then rectified in order to provide power to a load 112, as is illustrated in FIGS. 1 and 2. During data transmission mode, MST of transaction data is again performed using coil 108. Several examples of the dual mode receiver is provided below.

Figure 3:
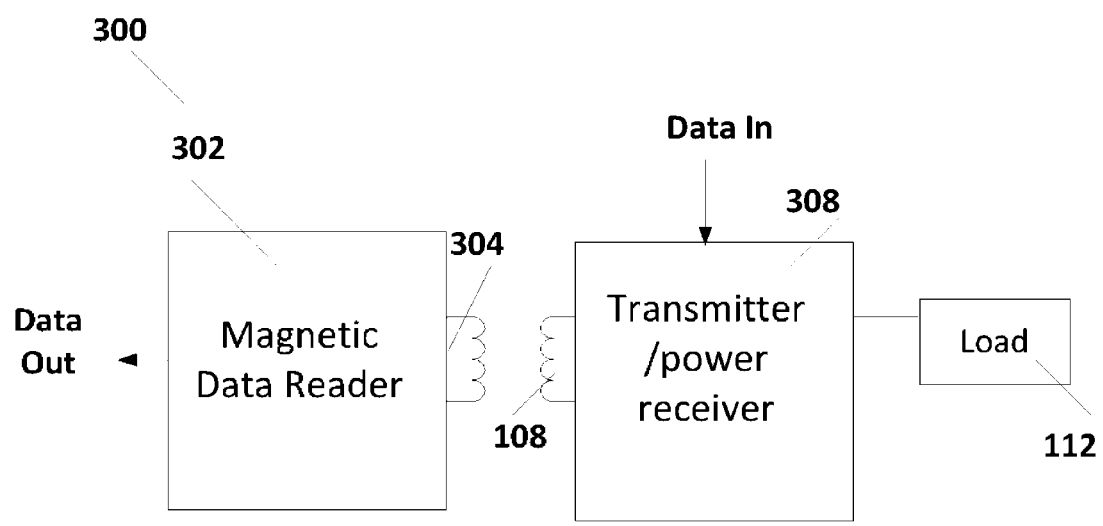
FIG. 3 illustrates a receiver according to some embodiments interacting with a data transaction terminal.

FIG. 3 illustrates a system 300 that includes a wireless power receiver 308 according to some embodiments of the present invention interacting with a magnetic data reader 302. Data reader 302 can be any data reader that reads magnetic data, for example magnetic strip readers and other such devices. Receiver 308 can also interact with wireless power transmitter 102 as illustrated in FIG. 1 to receive wireless power and supply power to load 112. However, as is shown in FIG. 3, receiver 308 also receives data and transmits that data to data reader 302 using coil 108. The data transmitted by coil 108 is inductively received by coil 304 of data reader 302 and output to other devices as digital data by data reader 302. Receiver 308 can transmit data to magnetic data reader 302 in formats and according to standards expected by data reader 302 that are well understood by those skilled in the art.

Figure 4A:
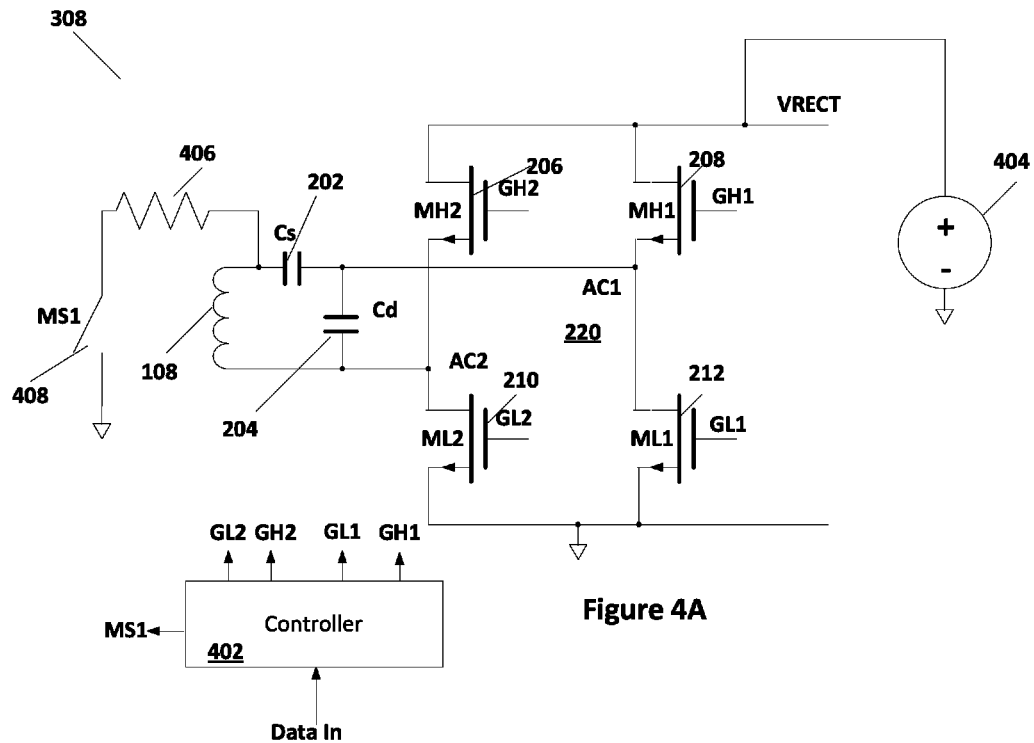
FIGS. 4A and 4B illustrate a receiver according to some embodiments of the present invention.
Figure 4B:
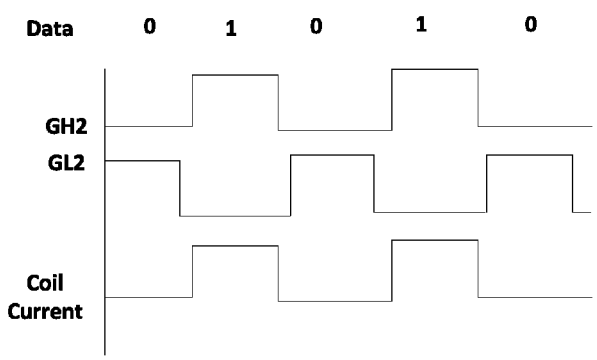

FIGS. 4A and 4B illustrates an example of receiver 308. FIG. 4A illustrates a wireless power receiver 308 according to some embodiments with a half-bridge implementation of the data transmission mode. As is illustrated in FIG. 4A, receiver 308 includes a rectifier 220, which includes transistors 206, 208, 210, and 212 configured as a full-wave rectifier as is discussed with respect to FIG. 2. Further, receiver includes coil 108 coupled through capacitors 202 and 204 to supply AC power, indicated as AC1 and AC2, to rectifier 220. Consequently, during power transmission mode, power is received by coil 108, rectified by rectifier 220, and provided to load 112 as illustrated in FIG. 2. However, receiver 308 further includes a data transaction mode. As shown in the example illustrated in FIG. 4A, in data transaction mode a power supply 404 is coupled to VRECT. Power supply 404 may, for example, be load 112 where load 112 includes a battery such as power supply 404. Further, a resistor 406 is coupled through a switch 408 between ground and coil 108.

As is shown in FIG. 4A, controller 402 provides control inputs to gate GH2 of transistor 206, gate GH1 of transistor 208, gate GLS of transistor 210, and gate GL1 of transistor 212 as well as control signal MS1 to switch 408. Switch 408 may, for example, be a transistor, in which case signal MS1 is the gate of the transistor of switch 408. In power receiving mode, controller 402 provides signal MS1 to open switch 408 (i.e. switch 408 is off) and controller 402 provides gate signals GL2, GH2, GL1, and GH1 that drive transistors 206, 208, 210, and 212 to rectify the power signal received by coil 108 to provide the DC signal VRECT to load 112, as is illustrated in FIG. 1.

In data transaction mode, controller 402 provides control signal MS1 to close switch 408 (i.e. switch 408 is on). Controller 402 further receives data to be transmitted by magnetic signal transmission (MST) through coil 108 and provides signals GH2 to transistor 206 and GL2 to transistor 210 to transmit data through coil 108. The gates of transistors 208 and 212, signals GH1 and GL1, respectively, may be driven low so that transistors 208 and 212 are off.

As such, in data transaction mode VRECT is the input power supply and transistors 206 and 210 of rectifier 220 are reconfigured as an inverter or output driver. The current supplied through coil 108 is determined by the resistance value of resistor 406, the on resistance of switch 408, and the on resistance of transistor 206. Digital data can be transmitted as either current passing through coil 108 or no current passing through coil 108. The current through coil 108 determines the strength of the transmitted magnetic field, and thereby determines the range at which magnetic data reader 302 can read the data transmitted by coil 108. In some embodiments, resistor 406 may be a short to ground, in which case the current limiter of power supply 404 determines the current through coil 108.

FIG. 4B illustrates transmission of data by driving gate GH2 of transistor 206 and gate GL2 of transistor 210 in a non-overlapping fashion while turning transistors 208 and 212 off. As is illustrated in FIG. 4B, data bits 0 and 1 are transmitted as coil current on or off (i.e., magnetic field on or off). Current passes through coil 108 when transistor 206 is on (signal GH2 is high) and transistor 210 is off (signal GL2 is low) and does not pass through coil 108 when transistor 206 is off (GH2 is low) and transistor 210 is on (signal GL2 is low).

FIG. 5A illustrates another implementation of receiver 308 with a data transmission mode. As is shown in FIG. 5A, receiver 308 further includes a second switch 504 coupled between VRECT and switch 408. Controller 502 can then provide signal MS1 to switch 408 and signal MS2 to switch 504. During power receiving mode, controller 502 provides signals MS1 and MS2 to open switches 504 and 408. As discussed above, power received in coil 108 is rectified by rectifier 220 and provided between VRECT and ground to load 112.

Receiver 308 as illustrated in FIG. 5A can operate in either a half-bridge implementation of the data transition mode or a full-bridge implementation of the data transmission mode. In the half-bridge implementation, controller 502 produces a high GL2 to turn on transistor 210 while producing low signals for GH2, GH1, and GL1 to turn off transistors 206, 208, and 212, respectively. Then, as is shown in FIG. 5B, controller 502 can produce signals MS1 and MS2 to modulate the current through coil 108 according to the input data. As is illustrated in FIG. 5B, current flows through coil 108 when switch 504 is closed (a high value for signal MS2) and switch 408 is open (a low value for signal MS1). Alternatively, no current flows through coil 108 when switch 504 is open (a low value for signal MS2) and switch 408 is closed (a high value for signal MS1).

In some embodiments, controller 502 may provide a high GH2 signal to transistor 206 and a low GL2 signal to transistor 210. In such case, no current flows through coil 108 when switch 504 is closed (a high value for signal MS2) and switch 408 is open (a low value for signal MS1). Current flows through coil 108 when switch 504 is open (a low value for signal MS2) and switch 408 is closed (a high value for signal MS1). Such an arrangement of controller 502 provides for a coil current opposite that shown in FIG. 5B.

The implementation of receiver 308 as illustrated in FIG. 5A can also be operated in a full-bridge mode. In such operation, instead of data being transmitted by turning on current through coil 108 and turning off current through coil 108, data can be transmitted by switching the direction of current through coil 108. FIG. 5C illustrates transmission of data by simultaneously modulating switch 504 and transistor 210 with switch 408 and transistor 206. As is illustrated in FIG. 5C, when transistor 206 and switch 408 are on while transistor 210 and switch 504 are off, current flows in a first direction through coil 108. Current flows in the opposite direction through coil 108 when transistor 210 and switch 504 are on while transistor 206 and switch 408 are off.

In the implementation as illustrated in FIG. 5A, then, controller 502 can manipulate switch signals MS1 MS2, GL2 and GH2 in either a half-bridge or full-bridge implementation of the data transmission mode. In either case, transistors 208 and 212 can be turned off.

Figure 6:
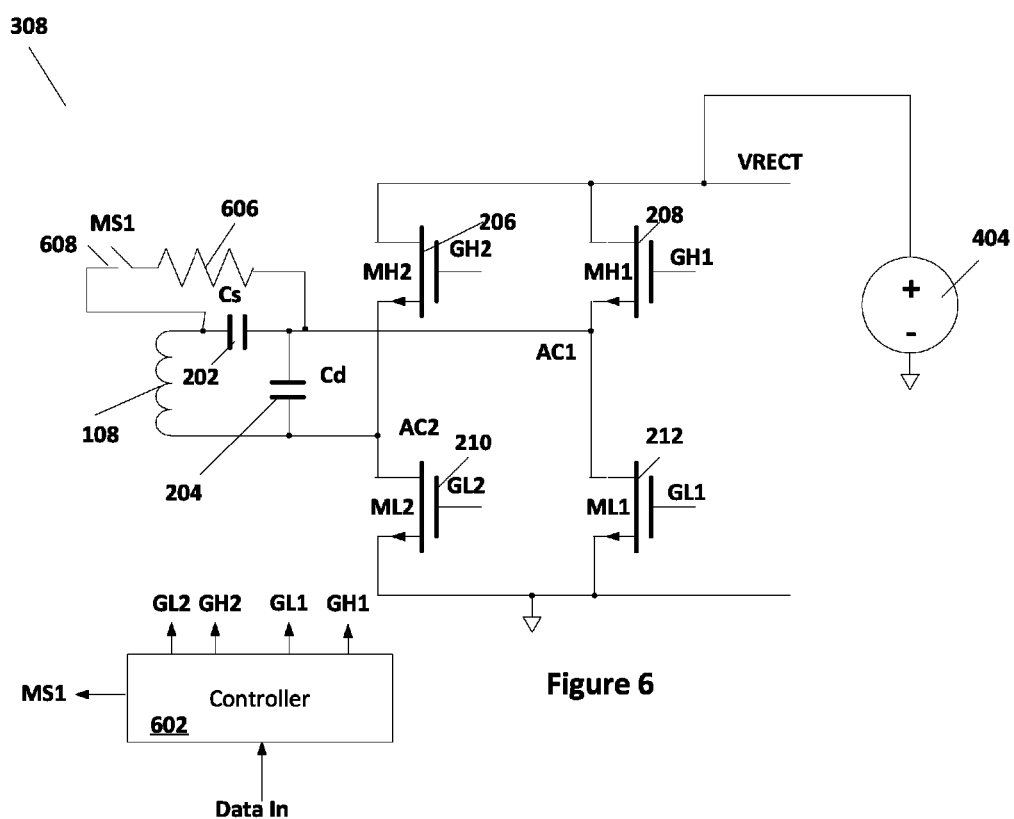
FIG. 6 illustrates another receiver according to some embodiments of the present invention.

FIG. 6 illustrates another embodiment of receiver 308 with a data transition mode. The implementation of receiver 308 illustrated in FIG. 6 can be operated in either a half-bridge or full-bridge implementation of the data transmission mode.

As shown in FIG. 6, resistor 606 is coupled across capacitor 202. In some embodiments, a switch 608 controlled by signal MS1 may be placed in series with resistor 606. During wireless power transmission mode, switch 608 may be open (signals MS1 is low). In embodiments absent switch 608, resistor 606 may be chosen to reduce power loss during wireless power transmission mode.

During data transaction mode, controller 602 can close switch MS1 and modulate the current through coil 108 in a half-bridge mode by turning transistor 210 on (signal GL2 high), transistor 206 (signal GH2 low) off and modulating the signals GH1 and GL1 on transistors 208 and 212, respectively, for example. Under such circumstances, current flows through coil 108 when transistor 208 is turned on (transistor 212 is off) and does not flow through coil 108 when transistor 212 is turned on (transistor 208 is off). Half-bridge operation can also be implemented by turning transistor 206 on, transistor 210 off, and modulating the current by turning on and off in a non-overlapping fashion transistors 208 and 212. Alternatively, controller 602 can turn transistor 208 on (signal GH1 high), transistor 212 off (signal GL1 low), and modulate signals GH2 and GL2 to transistors 206 and 210, respectively, to transmit data through coil 108. A half-bridge operation can also be implemented with transistor 208 off, transistor 212 on, and modulating the current through coil 108 with transistors 206 and 210.

In some embodiments, a full bridge control can be affected by controller 602 by turning transistors 206 and 212 (signals GH2 and GL1 high) on and transistors 208 and 210 off (signals GH1 and GL2 low) for one current state and turning transistors 208 and 210 on (signals GH1 and GL2 high) and transistors 206 and 212 off (signals GH2 and GL1 low) for an opposite current state. In the full-bridge implementation, the magnetic field, instead of switching on and off, switches direction as controlled by controller 602 according to the data input.

The current through coil 108, and therefore the magnetic field strength generated by coil 108, can be determined by the resistance of resistor 606 along with the on resistances of the transistors and the switches involved. If resistor 606 is particularly low resistance, in some embodiments shorted, then the current through coil 108 can be determined by a current limiter in power supply 404.

Figure 7:
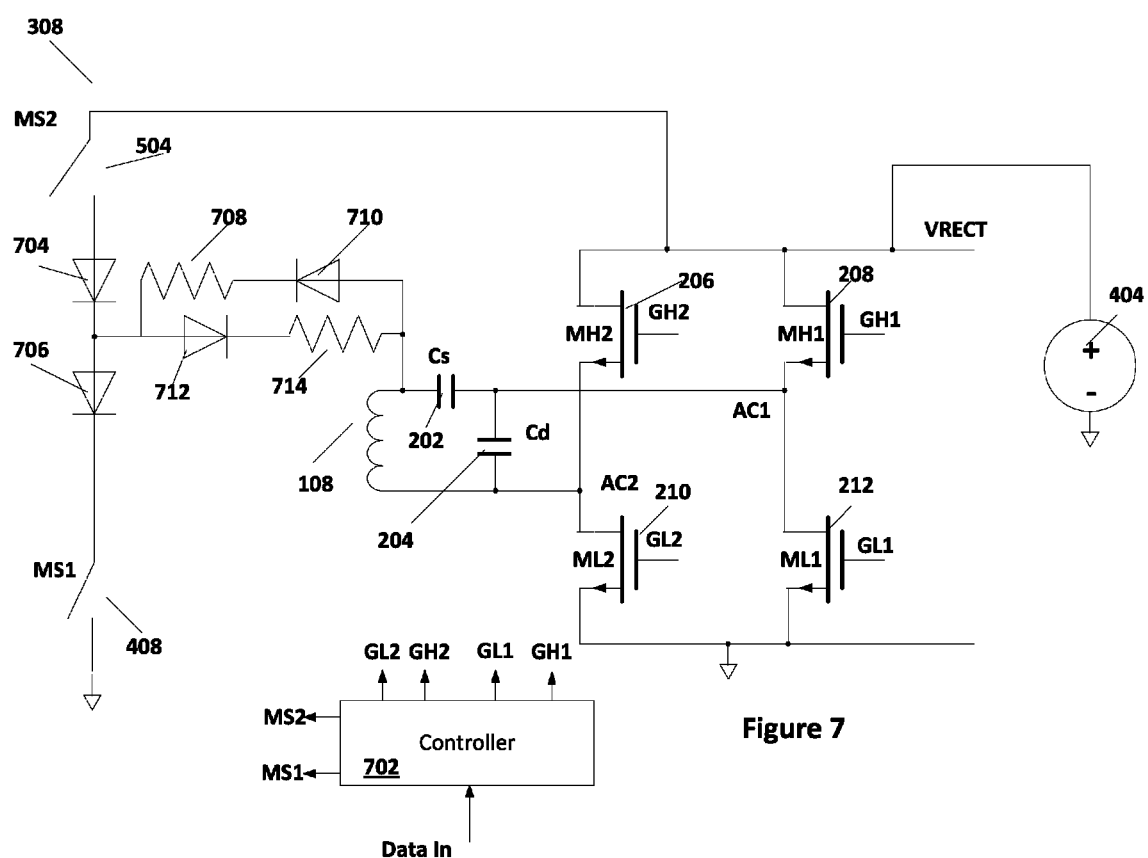
FIG. 7 illustrates another receiver according to some embodiments of the present invention.

FIG. 7 illustrates another example of receiver 308 according to some embodiments of the invention. In this example, diodes 704 and 706 are coupled in series between switches 504 and 408. Resistor 406 is replaced by a series connection of diode 710 and resistor 708 coupled in parallel with oppositely oriented diode 712 in series with resistor 714. The data transition mode of the embodiment of receiver 308 illustrated in FIG. 7 operates similarly to the data transition modes of the embodiment of receiver 308 illustrated in FIG. 5A. As is illustrated in FIG. 7, controller 702 can modulate the current through coil 108 in order to transmit data by turning transistor 210 on, transistor 206 off, and modulating switches 504 and 408. Alternatively, a full bridge mode can be affected by generating a first current by turning transistor 210 and switch 504 on while transistor 206 and switch 408 are off and a second current by turning transistor 206 and switch 408 on wile transistor 210 and switch 504 are off. In power transmission mode, switches 504 and 408 may be open.

Figure 8:
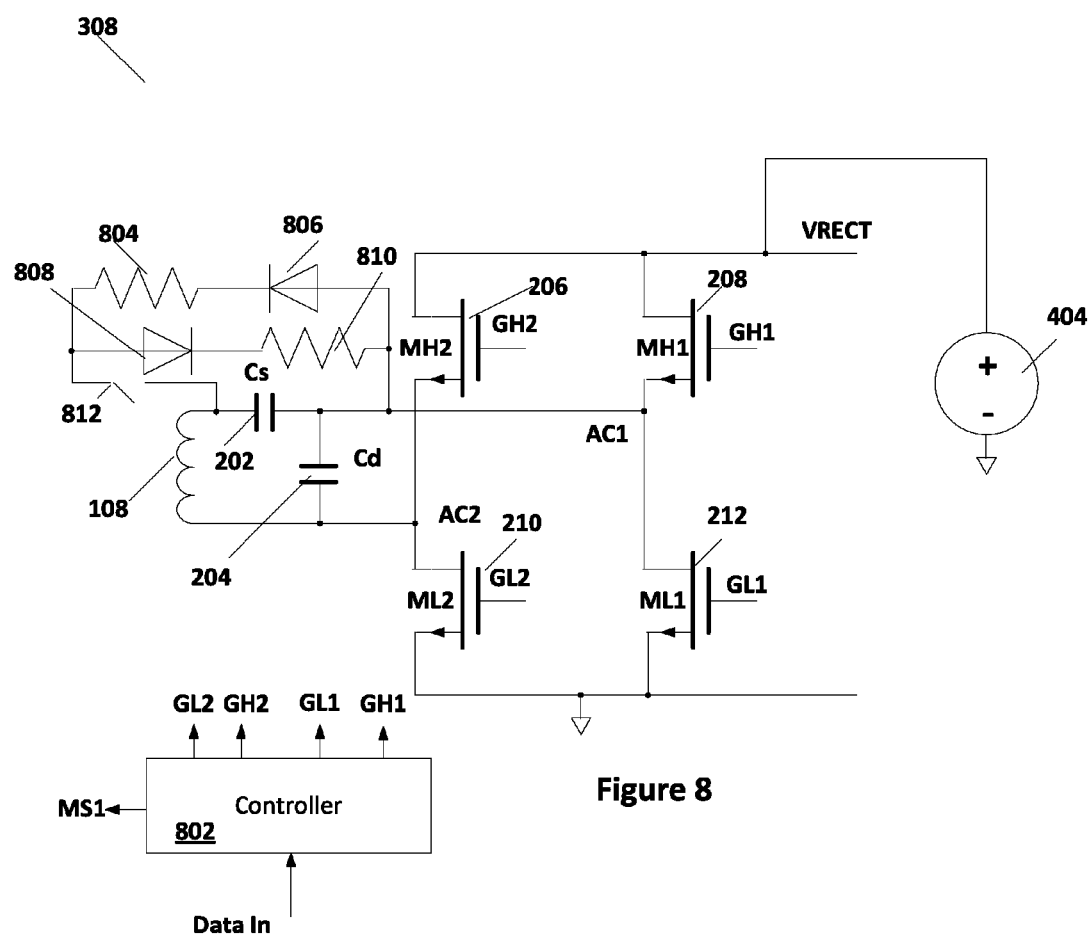
FIG. 8 illustrates another receiver according to some embodiments of the present invention.

FIG. 8 illustrates another example of receiver 308 with both a power generation mode and a data transmission mode. In this case, diode 806 in series with resistor 804 is coupled across capacitor 202. Additionally, diode 808 and resistor 810 is coupled across resistor 202. Diodes 808 and 806 are arranged to allow current flow in either direction. As is discussed previously in some embodiments, a switch 812 may be placed in series with the parallel arrangement of diode 806 and resistor 804 and diode 808 and resistor 810, as shown in FIG. 8. Switch 812 may be closed in data transmission mode and open in wireless power transmission mode.

The above detailed description is provided to illustrate specific embodiments of the present invention and is not intended to be limiting. Numerous variations and modifications within the scope of the present invention are possible. The present invention is set forth in the following claims.

What is claimed is:

1. A dual purpose receiver/transmitter, comprising:
   a coil;
   a rectifier circuit coupled to the coil, the rectifier circuit including first and second transistors coupled in series between a power line and a ground line with a first end of the coil coupled between the first and second transistors, and third and fourth transistors coupled in series between the power line and the ground line with a second end of the coil coupled between the third and fourth transistors through a first capacitor;

a data transmission circuit including a first switch coupled to the second end of the coil; and a controller coupled to the rectifier circuit and the data transmission circuit, the controller configured to provide control signals to the rectifier circuit and to the data transmission circuit to rectify wireless power received by the coil in a wireless power receive mode and configured to provide control signals to each of the first, second, third, and fourth transistors of the rectifier circuit and the first switch of the data transmission circuit to provide current to the coil according to data in a data transmission mode, wherein the controller operates in a data transmission mode by closing the first switch and modulating current through the coil by providing gate signals in a non-overlapping fashion to the first transistor and the second transistor according to the data.

2. The receiver/transmitter of claim 1, further including a second capacitor coupled between the first end of the coil and the second end of the coil.

3. The receiver/transmitter of claim 1 wherein the data transmission circuit includes a resistor coupled to the second end of the coil and wherein the first switch is coupled between the resistor and a ground.

4. The receiver/transmitter of claim 1, wherein the controller operates in a wireless power transmission mode by opening the first switch and providing signals to the first transistor, the second transistor, the third transistor and the fourth transistor to provide rectification of a power signal received by the coil.

5. The receiver/transmitter of claim 1 wherein the controller further provides gate signals to open the third transistor and the fourth transistor.

6. The receiver/transmitter of claim 1, wherein the data transmission circuit includes a resistor coupled in series with the first switch across the first capacitor and wherein the controller in data transmission mode provides signals to the first transistor, the second transistor, the third transistor, and the fourth transistor to drive current through the coil according to the data.

7. The receiver/transmitter of claim 6 wherein the controller provides the signals to operate in a half-bridge implementation.

8. The receiver/transmitter of claim 6, wherein the controller provides the signals to operating in a full-bridge implementation.

9. The receiver/transmitter of claim 6, wherein the data transmission circuit includes one or more diodes.

10. A dual purpose receiver/transmitter, comprising:
a coil;
a rectifier circuit coupled to the coil, the rectifier circuit including first and second transistors coupled in series between a power line and a ground line with a first end of the coil coupled between the first and second transistors, and third and fourth transistors coupled in series between the power line and the ground line with a second end of the coil coupled between the third and fourth transistors through a first capacitor;
a data transmission circuit including a first switch coupled to the second end of the coil; and
a controller coupled to the rectifier circuit and the data transmission circuit, the controller configured to provide control signals to the rectifier circuit and to the data transmission circuit to rectify wireless power received by the coil in a wireless power receive mode and configured to provide control signals to each of the first, second, third, and fourth transistors of the rectifier circuit and the first switch of the data transmission circuit to provide current to the coil according to data in a data transmission mode, wherein the data transmission circuit includes a resistor coupled to the second end of the coil and wherein the first switch is coupled between the resistor and a ground, and wherein the data transmission circuit further includes a second switch coupled between the power line and the resistor.

11. The receiver/transmitter of claim 10, wherein the controller operates in a wireless power transmission mode by opening the first switch and the second switch and providing signals to the first transistor, the second transistor, the third transistor and the fourth transistor to provide rectification of a power signal received by the coil.

12. The receiver/transmitter of claim 10, wherein the controller operates in a data transmission mode by providing signals to the first transistor and the second transistor and modulating the first switch and the second switch according to the data in a half-bridge implementation.

13. The receiver/transmitter of claim 10, wherein the controller operates in a data transmission mode by providing signals to the first transistor, second transistor, first switch, and second switch according to the data in a full-bridge implementation.

14. The receiver/transmitter of claim 10, wherein the data transmission circuit includes one or more diodes.

15. A method, comprising:
receiving wireless power through a coil while in a wireless power transmission mode by
providing signals to a rectifier circuit, the rectifier circuit comprising first and second transistors coupled in series between a power line and a ground line with a first end of the coil coupled between the first and second transistors and third and fourth transistors coupled in series between the power line and the ground line with a second end of the coil coupled between the third and fourth transistors through a first capacitor, to rectify a received power from the coil, and
providing signals to first switch coupled to the second end of the coil in a data transmission circuit; and
transmitting data magnetically through the coil while in a data transmission mode by
providing signals to the first switch of the data transmission circuit and the first and second transistors of the rectifier circuit to drive current through the coil according to the data, wherein the in a data transmission mode the signals close the first switch and modulate current through the coil by providing gate signals in a non-overlapping fashion to a first transistor and a second transistor of the rectifier according to the data.

16. The method of claim 15, wherein receiving wireless power comprises:
opening the first switch;
receiving power transmitted by a wireless power transmitter at the coil;
rectifying the power received at the coil; and
supplying rectified power to a load.

17. The method of claim 16, wherein rectifying the power received at the coil includes full-wave rectifying power.

18. The method of claim 16, wherein transmitting data includes providing signals to a third transistor and a fourth transistor of the rectifier to provide a full-bridge driver for the coil.

* * * * *